(12) United States Patent
Ueda et al.

(10) Patent No.: US 12,380,803 B2
(45) Date of Patent: Aug. 5, 2025

(54) STOP DETECTION DEVICE AND STOP DETECTION METHOD

(71) Applicant: TOYOTA JIDOSHA KABUSHIKI KAISHA, Toyota (JP)

(72) Inventors: Kenki Ueda, Toyota (JP); Ryosuke Tachibana, Toyota (JP); Shinichiro Kawabata, Toyota (JP); Takashi Kitagawa, Toyota (JP); Takanori Kato, Tokyo (JP); Hidetoshi Nitta, Tokyo (JP); Kohei Harayama, Tokyo (JP); Mizuki Mori, Tokyo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 344 days.

(21) Appl. No.: 18/062,662

(22) Filed: Dec. 7, 2022

(65) Prior Publication Data
US 2023/0196914 A1 Jun. 22, 2023

(30) Foreign Application Priority Data
Dec. 20, 2021 (JP) .................................. 2021-205924

(51) Int. Cl.
G08G 1/052 (2006.01)
G06T 7/246 (2017.01)
G06V 10/22 (2022.01)
G06V 20/56 (2022.01)
G08G 1/04 (2006.01)

(52) U.S. Cl.
CPC ............ *G08G 1/052* (2013.01); *G06T 7/248* (2017.01); *G06V 10/22* (2022.01); *G06V 20/588* (2022.01); *G08G 1/04* (2013.01); *G06T 2207/10016* (2013.01); *G06T 2207/30256* (2013.01)

(58) Field of Classification Search
CPC .......... G08G 1/052; G08G 1/04; G06T 7/248; G06V 10/22; G06V 20/588
See application file for complete search history.

(56) References Cited

U.S. PATENT DOCUMENTS

2020/0005646 A1* 1/2020 Wong ..................... G06V 20/58
2020/0342274 A1* 10/2020 ElHattab ................. B60Q 9/00

FOREIGN PATENT DOCUMENTS

| JP | 2010219933 A | 9/2010 |
| JP | 2012159955 A | 8/2012 |
| JP | 2021125142 A | 8/2021 |

* cited by examiner

*Primary Examiner* — Matthew C Bella
*Assistant Examiner* — Jinsu Hwang
(74) *Attorney, Agent, or Firm* — Dickinson Wright, PLLC

(57) ABSTRACT

A stop detection device includes: an acquirer that acquires multiple captured images captured in chronological order by a camera mounted on a vehicle; an image processor that performs image processing on acquired multiple captured images; and a detector that detects vehicle speed of a vehicle at a stop position based on a result of image processing. The image processor includes a stop position identification unit that detects a marking indicating a stop position from a captured image to identify a stop position, and a vehicle speed calculation unit that calculates vehicle speed by comparing captured images in chronological order. The vehicle speed calculation unit excludes a specific region from each of multiple captured images to compare captured images.

6 Claims, 6 Drawing Sheets

STOP DETECTION DEVICE AND STOP DETECTION METHOD

BACKGROUND

1. Technical Field

The present disclosure relates to a technology for detecting driving at a stop position based on images captured by a vehicle-mounted camera.

2. Description of Related Art

JP-A-2021-125142 discloses a safe driving degree evaluation device that judges whether or not a vehicle has performed a stop operation at a stop point where vehicles are required to stop. This safe driving degree evaluation device judges that a vehicle has passed through a stop point based on positioning data and map data and judges whether a vehicle has stopped at a stop point based on detection data from a vehicle speed sensor and an acceleration sensor.
Patent Literature 1: Japanese Unexamined Patent Application Publication No. 2021-125142 (JP-A-2021-125142)

In the technology described in JP-A-2021-125142, passing through a stop point is judged using the positioning data, and the driving state at a stop point is judged using the detection data from a vehicle speed sensor and an acceleration sensor. Accordingly, there may be a synchronization gap between those data. If a synchronization gap occurs, the accuracy of judging whether or not a stop operation was performed at a stop point will be degraded.

SUMMARY

A general purpose of the present disclosure is to provide a technology for accurately detecting driving at a stop position.

In response to the above issue, a stop detection device of one aspect of the present disclosure includes: an acquirer that acquires multiple captured images captured in chronological order by a camera mounted on a vehicle; an image processor that performs image processing on acquired multiple captured images; and a detector that detects vehicle speed of a vehicle at a stop position based on a result of image processing. The image processor includes a stop position identification unit that identifies a stop position based on a marking indicating a stop position detected from a captured image, and a vehicle speed calculation unit that calculates vehicle speed by comparing captured images in chronological order. The vehicle speed calculation unit excludes a specific region from each of multiple captured images to compare captured images.

Another aspect of the present disclosure relates to a stop detection method. The method is a stop detection method implemented by a computer and includes: acquiring multiple captured images captured in chronological order by a camera mounted on a vehicle; performing image processing on acquired multiple captured images; and detecting vehicle speed of a vehicle at a stop position based on a result of image processing. The performing image processing includes identifying a stop position based on a sign indicating a stop position detected from a captured image, and calculating vehicle speed by comparing captured images in chronological order. In the calculating vehicle speed, a specific region is excluded from each captured image to compare captured images.

BRIEF DESCRIPTION OF THE DRAWINGS

An embodiment will now be described, by way of example only, with reference to the accompanying drawings that are meant to be exemplary, not limiting, and wherein like elements are numbered alike in several figures, in which.

DETAILED DESCRIPTION

An embodiment will now be described. The embodiment is illustrative and is not intended to be limiting.

Figure 1:
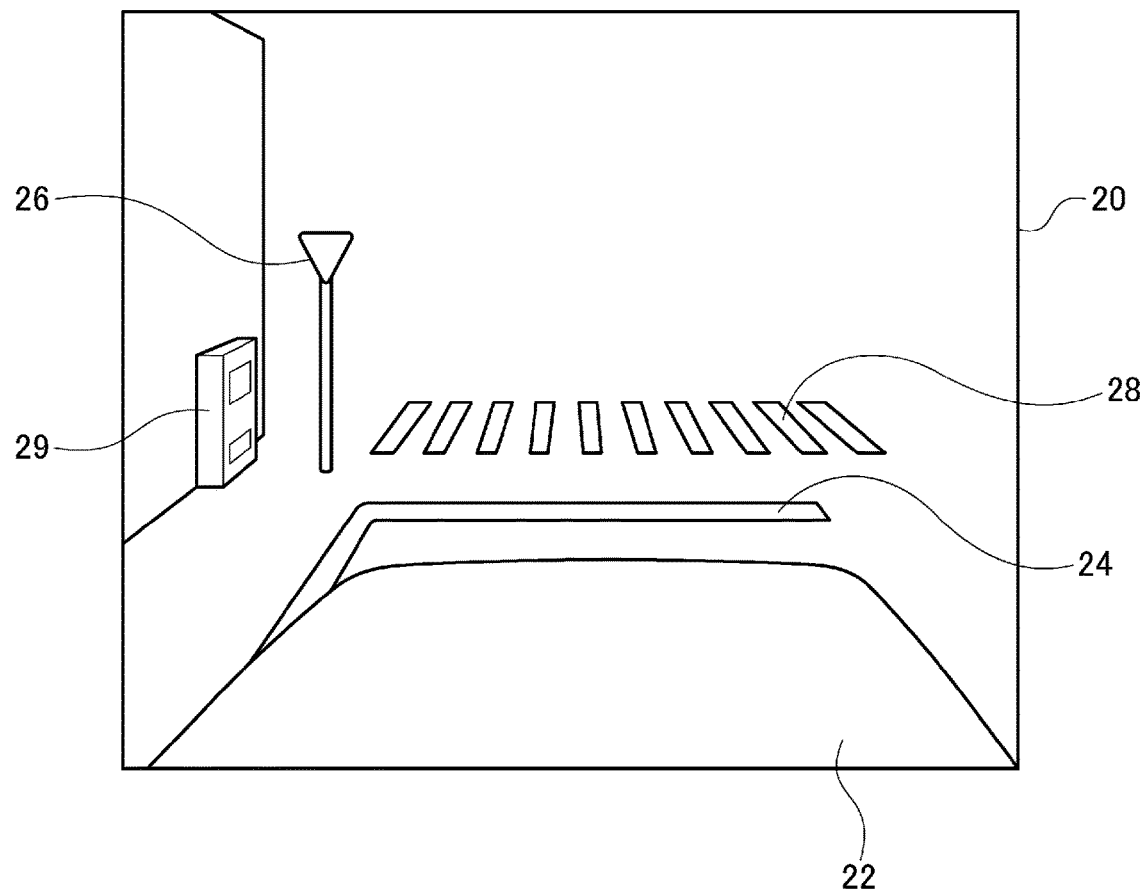
FIG. 1 is a diagram used to describe an overview of a stop detection device according to an embodiment and shows a captured image captured by a vehicle-mounted camera.

FIG. 1 is a diagram used to describe an overview of a stop detection device according to an embodiment and shows a captured image 20 captured by a vehicle-mounted camera. The stop detection device analyzes captured images 20 stored in a dashboard camera on a vehicle to detect whether appropriate driving was performed on the vehicle at a stop position.

For example, when a vehicle is brought to an automobile dealer, an operator retrieves a series of captured images 20 from the vehicle's dashboard camera and inputs the captured images 20 to the stop detection device. The stop detection device analyzes the input series of captured images 20 to detect whether appropriate driving was performed on the vehicle at a stop position and calculates a driving score. The driving score thus calculated is provided to the vehicle's driver, so that the driver can find his or her own driving ability.

The captured image 20 shown in FIG. 1 includes a vehicle's front portion 22, a temporary stop line 24, a stop sign 26, crosswalk markings 28, and a vending machine 29. The stop detection device is capable of detecting, by means of image processing, traffic markings including the temporary stop line 24, the stop sign 26, and the crosswalk markings 28, so as to identify a stop position. The stop detection device also detects a certain object, such as the vending machine 29, as a feature point and tracks the feature point included in captured images 20 arranged in chronological order to calculate the vehicle's speed. Thus, the stop detection device can derive a stop position and vehicle speed and can detect whether appropriate driving was performed on the vehicle at the stop position.

In this way, since the stop detection device can detect whether appropriate driving was performed at a stop position only with the captured images 20, data can be retrieved more easily, compared to the case where sensor values are used instead of captured images. Only by removing the memory from the dashboard camera and inserting it into the input slot of the stop detection device, the operator can retrieve the captured images 20. In the case where multiple kinds of sensor values are used, the detection accuracy may be degraded due to a synchronization gap between the sensor values. However, by using only the captured images 20 for detection, the problem of the synchronization gap can be avoided.

Figure 2:
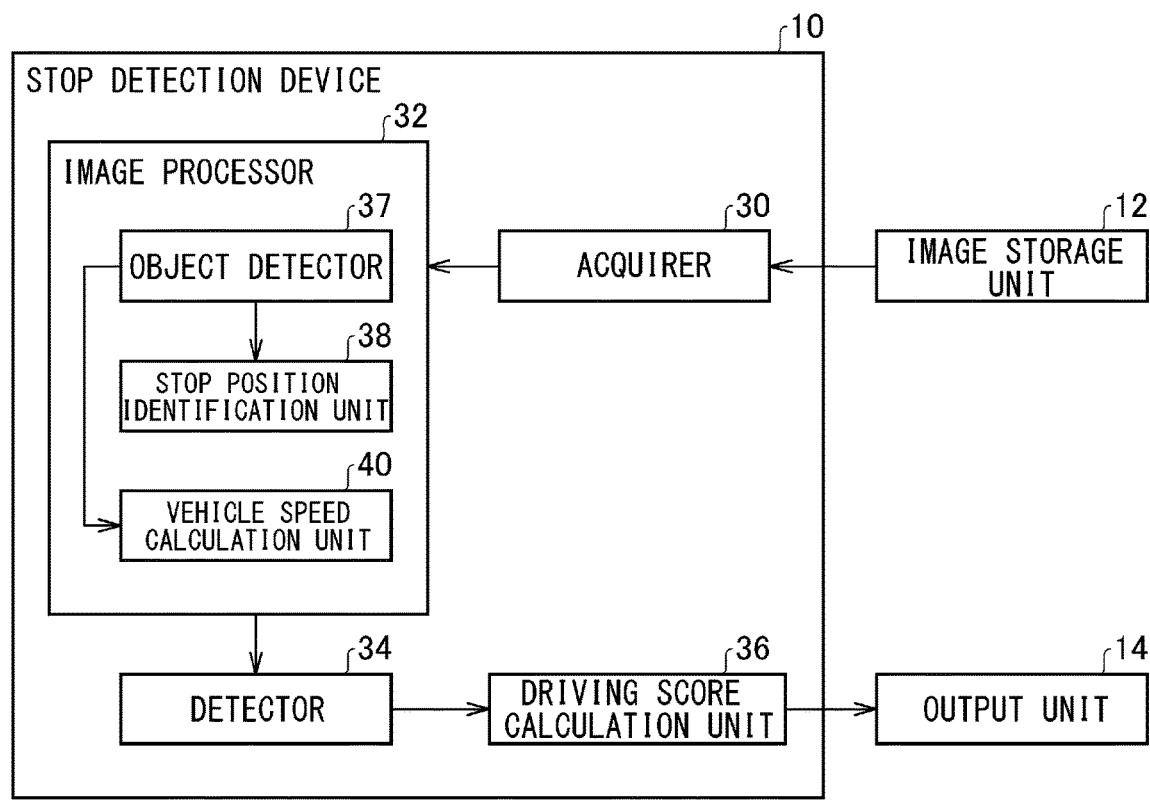
FIG. 2 shows a functional configuration of the stop detection device.

FIG. 2 shows a functional configuration of a stop detection device 10. Each function of the stop detection device 10 can be implemented by a circuit block, memory, an LSI or the like in terms of hardware, and by memory-loaded system software, a memory-loaded application program, or the like in terms of software. Therefore, it will be obvious to those skilled in the art that each function of the stop detection device 10 may be implemented in a variety of forms by hardware only, software only, or a combination thereof, and the form is not limited to any of them.

An image storage unit 12 stores captured images of the surroundings of a vehicle captured by a vehicle-mounted camera. The captured images stored in the image storage unit 12 are arranged in chronological order and constitute moving images. The stop detection device 10 acquires a moving image stored in the dashboard camera from the image storage unit 12. The image storage unit 12 is hardware such as a flash memory and may be manually removed by an operator from the vehicle and connected to the stop detection device 10. The image storage unit 12 may also be connected to the stop detection device 10 via a network such as the Internet using a communication device on the vehicle.

An output unit 14 is a display, a speaker, or the like and outputs a detection result from the stop detection device 10 to the driver. The output unit 14 may be integrated with the stop detection device 10 or may be provided separately.

The stop detection device 10 includes an acquirer 30, an image processor 32, a detector 34, and a driving score calculation unit 36. The acquirer 30 acquires, from the image storage unit 12, multiple captured images captured in chronological order by the vehicle-mounted camera.

The image processor 32 performs image processing on acquired multiple captured images 20. The image processor 32 includes an object detector 37, a stop position identification unit 38, and a vehicle speed calculation unit 40. The image processor 32 may perform image processing on all data stored in the image storage unit 12 but may perform image processing on data acquired during driving. Accordingly, before the processing at the object detector 37 is performed, processing for excluding data acquired when the vehicle is not driven may be performed.

The object detector 37 detects an object included in a captured image 20 using an object detection model such as YOLO. The object detector 37 performs object detection processing on all input captured images 20. The multiple captured images 20, constituting a moving image of 30 frames per second, for example, are arranged in chronological order. The object detector 37 derives the position coordinates of a detected object on a captured image and the type of the object. The position coordinates of an object may be the position coordinates of the four corners of a rectangle that surrounds the object.

The stop position identification unit 38 detects a marking indicating a stop position from a captured image 20 to identify the stop position. The marking indicating a stop position is a specific traffic marking, such as the temporary stop line 24 and the stop sign 26 shown in FIG. 1.

The stop position identification unit 38 extracts a marking indicating a stop position among objects detected by the object detector 37 and calculates the distance between the extracted temporary stop line and the own vehicle to identify the stop position. The stop position identification unit 38 may identify a stop position only when the stop position identification unit 38 has detected both the temporary stop line 24 and the stop sign 26 from one frame of the captured image 20. This can reduce false detections of the stop position.

The vehicle speed calculation unit 40 calculates vehicle speed by comparing captured images 20 in chronological order. The vehicle speed calculation unit 40 excludes a specific region from each of multiple captured images 20 to compare captured images 20. This specific region will be described with reference to new drawings.

Figure 3:
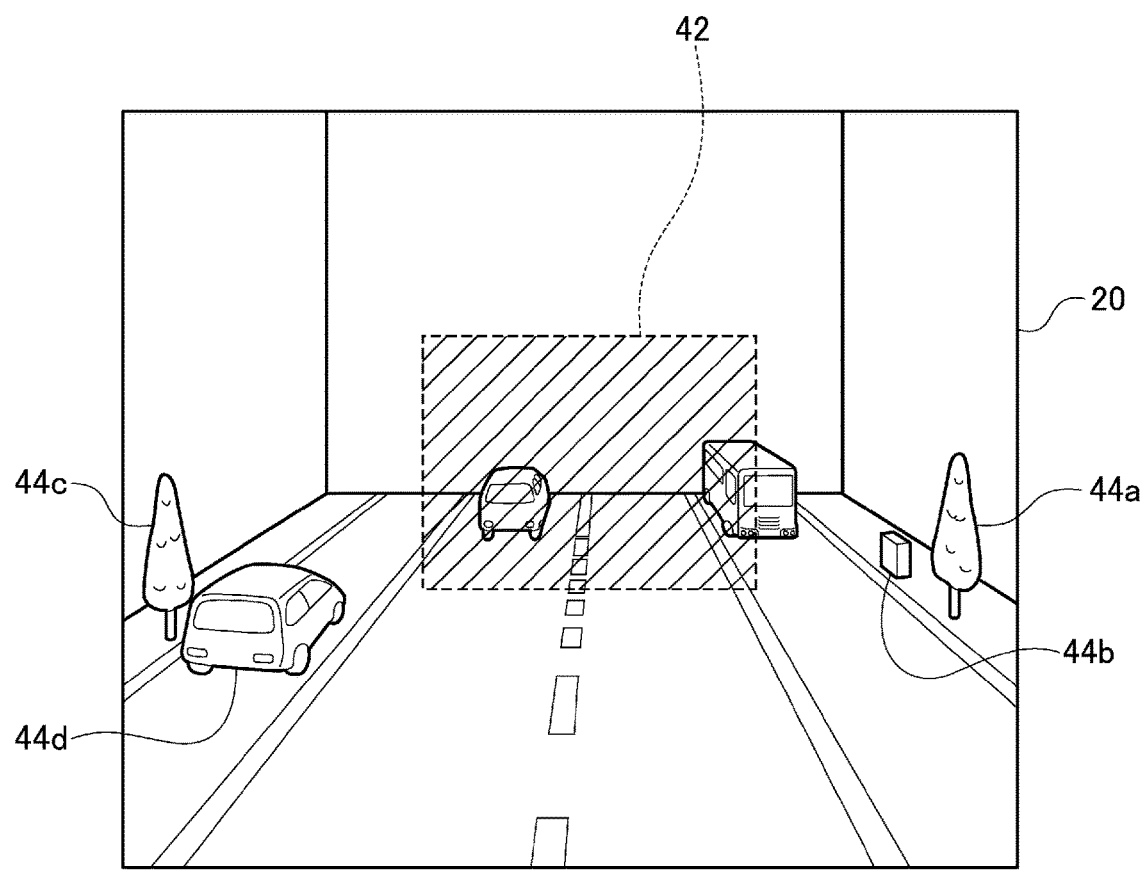
FIG. 3 shows a captured image in which a center region is excluded by a vehicle speed calculation unit.

FIG. 3 shows a captured image 20 in which a center region 42 is excluded by the vehicle speed calculation unit 40. The captured image 20 shown in FIG. 3 also includes multiple objects 44a, 44b, 44c, and 44d as feature points. The multiple objects 44a, 44b, 44c, and 44d as feature points are detected by the object detector 37. The vehicle speed calculation unit 40 calculates the amount of positional displacement of each of the multiple objects 44a, 44b, 44c, and 44d in chronological order and detects the vehicle speed based on the amount of positional displacement. In this way, the vehicle speed calculation unit 40 tracks a feature point included in the captured images 20 arranged in chronological order to calculate the vehicle speed.

The feature points may be the center points of the multiple objects 44a, 44b, 44c, and 44d or may be the points at the four corners of the objects. The feature points are mainly signs, trees, and buildings located outside the roadway and found less often on the roadway. The objects 44a and 44c are trees and the object 44b is a power distribution box, which are fixed to the ground.

The object 44d is a moving vehicle and thus becomes noise in the vehicle speed calculation processing. Accordingly, if the object 44d is tracked to calculate the vehicle speed, the calculation accuracy will be degraded. Therefore, the vehicle speed calculation unit 40 performs processing for excluding the center region 42 as the specific region from each captured image 20 and tracks the objects 44a, 44b, 44c, and 44d excluding an object that overlaps the center region 42. By excluding a specific region (such as the center region 42) from each captured image 20, a noise factor in the vehicle speed detection can be excluded. In other words, the specific region is a region in which part of a captured image 20 is masked. As shown in FIG. 3, the center region 42 is a region including the center point of the captured image 20 and positioned in the center. However, the position of the left, right, top, and bottom of the region in the captured image 20 may be adjusted through an experiment or the like.

By setting the specific region to the predetermined center region 42 positioned in the center of each captured image 20, a region in which a vehicle traveling in front or an oncoming vehicle is likely to be included can be easily excluded, so that the image processing can be simplified. Also, since signs and buildings outside the roadway are usually located in areas on both end sides rather than in the center region 42, an object to be tracked can be secured even if the center region 42 is excluded.

The vehicle speed calculation unit 40 sets the size of the center region 42 as the specific region based on road information. For example, the vehicle speed calculation unit 40 may set the width of the center region 42 based on the road width indicated by the road information and hence may set a larger width of the center region 42 when the road width is larger. The width of the center region 42 may be set to three levels of "large", "medium", and "small", for example; "small" is set for one lane each way, "medium" for two lanes each way, and "large" for three or more lanes each way.

When the road information indicates a slope, the height of the center region 42 in the captured image 20 may be adjusted to extend upward or downward based on the slope angle, so that the vertical length of the center region 42 may be adjusted. For example, when the slope is uphill, the vehicle speed calculation unit 40 may set the vertical length of the center region 42 longer in the upward direction compared to the case of level ground; when the slope is downhill, the vehicle speed calculation unit 40 may set the vertical length of the center region 42 longer in the downward direction compared to the case of level ground. In this way, by setting the size of the center region 42 based on the road information, a region in which a moving object is likely to be included can be excluded. The road information is derived from the captured images 20.

Figure 4:
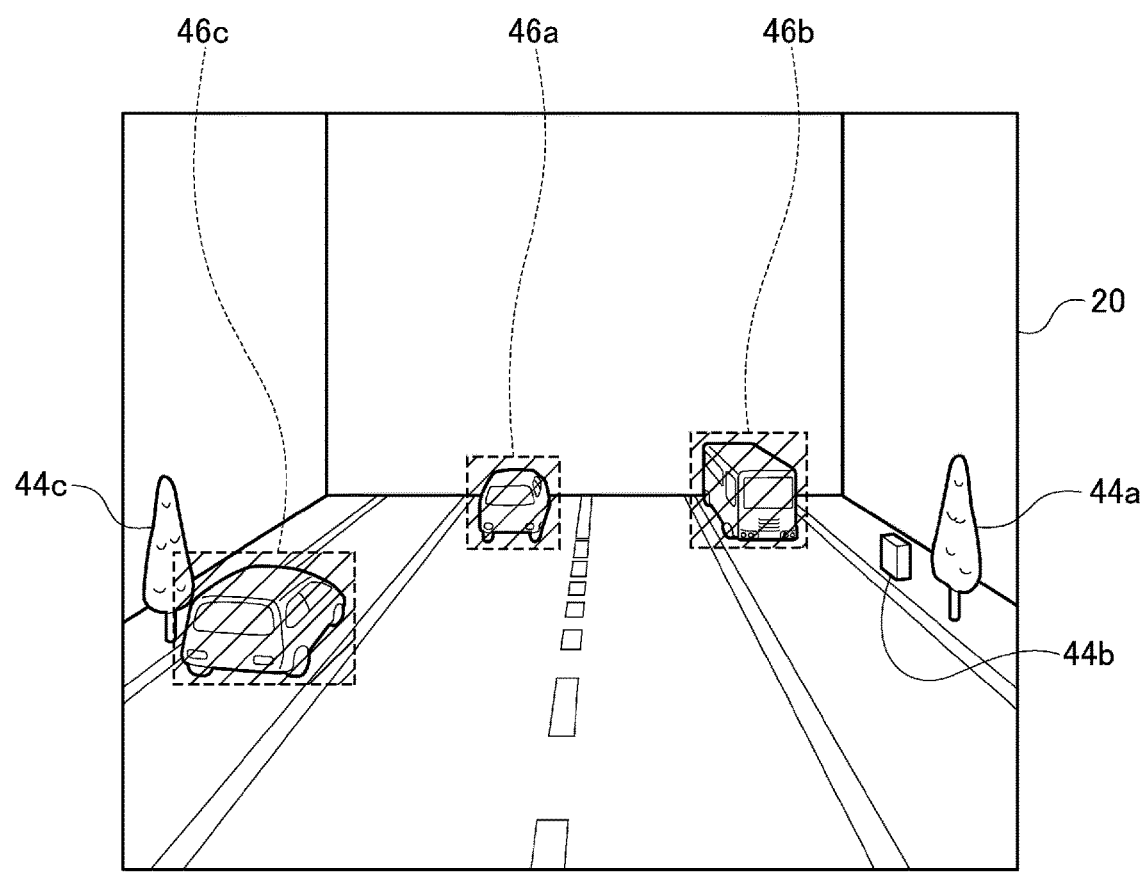
FIG. 4 shows a captured image in which moving object regions are excluded by the vehicle speed calculation unit.

FIG. 4 shows a captured image 20 in which moving object regions 46 are excluded by the vehicle speed calculation unit 40. In FIG. 4, moving object regions 46 that each cover an individual moving object are set as the specific regions in the same captured image 20 as shown in FIG. 3, and image processing for excluding the moving object regions 46 is performed.

As shown in FIG. 4, for multiple moving objects included in the captured image 20, moving object regions 46a, 46b, and 46c are individually set and masked. These moving objects have been detected and identified as vehicles by the object detector 37. The moving objects may include people besides vehicles. Each moving object region 46 is formed as a rectangle based on the maximum vertical length and the maximum horizontal length of a moving object in a captured image and formed to fit the size of the moving object.

Thus, the vehicle speed calculation unit 40 sets moving objects included in the captured image 20 as the specific regions (moving object regions 46a, 46b, and 46c) to mask the moving object regions 46a, 46b, and 46c and tracks, as feature points, the stationary objects 44a, 44b, and 44c to calculate the vehicle speed. In the processing of excluding the moving object regions 46, moving objects detected by the object detection model are excluded, so that noise can be removed more accurately compared to the case of excluding the center region 42.

The vehicle speed calculation unit 40 sets the specific region to either a predetermined center region or a moving object, based on driving environment information. In other words, the vehicle speed calculation unit 40 appropriately determines whether to set the specific region to be masked to the center region or a moving object region, depending on the driving environment. For example, if the weather is rainy, it may be unable to exclude a moving object accurately because of degraded detection accuracy of the object detector 37. Accordingly, the vehicle speed calculation unit 40 sets the specific region to the center region 42 when the weather is bad, such as rain or snow, and sets the specific region to a moving object region 46 when the weather is not bad. Therefore, the processing of tracking a feature point can be performed accurately.

The description now returns to FIG. 2. Based on the image processing results, the detector 34 detects the vehicle speed at a stop position. Since the vehicle-mounted camera has blind spots, the captured images 20 do not show the moment when the vehicle passes over the temporary stop line 24. Therefore, with reference to FIG. 5, the processing performed by the detector 34 will be described.

Figure 5:
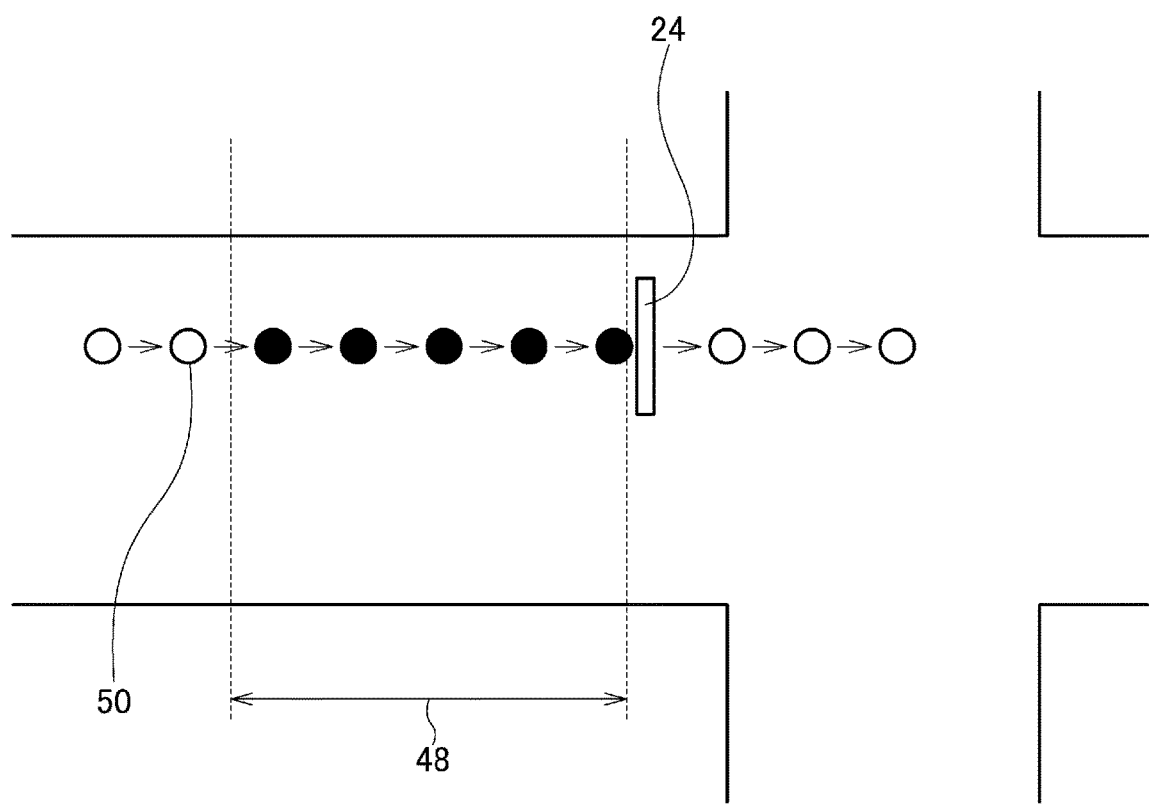
FIG. 5 is a diagram used to describe processing for detecting vehicle speed at a stop position.

FIG. 5 is a diagram used to describe processing for detecting the vehicle speed at a stop position. In FIG. 5, the progress of the vehicle's passing over the temporary stop line 24 is indicated by circles, and the vehicle-mounted camera captures images at the positions of circles. Due to the problems of the angle of view and the mounting position of the vehicle-mounted camera, the vehicle's front portion 22 is captured in the captured images 20, as shown in FIG. 1, so that, when the vehicle approaches the temporary stop line 24, the temporary stop line 24 cannot be captured.

For example, the temporary stop line 24 shown in FIG. 5 is not captured by the vehicle-mounted camera when the vehicle is positioned in an undetected range 48.

Accordingly, the detector 34 defines the timing of detection of the vehicle's approach within a predetermined distance to the stop position as the timing of the vehicle's passing through the stop position and detects the vehicle speed at the timing. The detector 34 receives, as the image processing results, information on the distance between the own vehicle and the stop position from the stop position identification unit 38, and vehicle speed information from the vehicle speed calculation unit 40. The information on the distance between the own vehicle and the stop position received from the stop position identification unit 38 and the vehicle speed information received from the vehicle speed calculation unit 40 is related to one of the captured images 20.

The undetected range 48 is determined based on the vehicle type, such as 3 meters. Accordingly, the detector 34 detects the vehicle's passing through the stop position from the captured image 20 captured at a position 50 outside the undetected range 48 and judges that, when the vehicle has approached within a predetermined distance to the stop position, the vehicle has passed through the stop position. The predetermined distance is set based on the undetected range 48 and may be set to any value in the range of 1 meter to 4 meters, for example. The predetermined distance may also be set based on the vehicle type and may be set shorter for a vehicle of which the vehicle's front portion 22 is shorter.

The description now returns to FIG. 2 again. Based on the image processing results, the detector 34 detects whether the vehicle speed at the stop position is predetermined vehicle speed or lower. Accordingly, whether the vehicle has stopped is judged. The predetermined vehicle speed is set to 10 kilometers per hour or lower. The detector 34 judges that appropriate driving was performed when the vehicle speed at the stop position is the predetermined vehicle speed or lower and judges that there was a stop sign violation when the vehicle speed at the stop position exceeds the predetermined vehicle speed.

The driving score calculation unit 36 calculates a driving score that represents the driver's driving skill, based on the detection results from the detector 34. The calculated driving score becomes high when appropriate driving was performed at the stop position and becomes higher as the vehicle speed at the stop position was lower. The stop detection device 10 may also detect traffic violations besides the stop sign violation and may calculate a total driving score. For example, the speed limit may be detected from a traffic sign, and whether the vehicle has kept the speed limit may be judged.

The driving score calculated by the driving score calculation unit 36 is output from the output unit 14 and provided to the driver, with voice or an image. In this way, since the stop detection device 10 is capable of diagnosing the driver's skill only from the captured images 20, the diagnosis can be easily conducted at an automobile dealer or the like. Therefore, when an elderly person brings a vehicle to an automobile dealer, for example, his or her driving skill can be diagnosed, and advice can be given accordingly.

Figure 6:
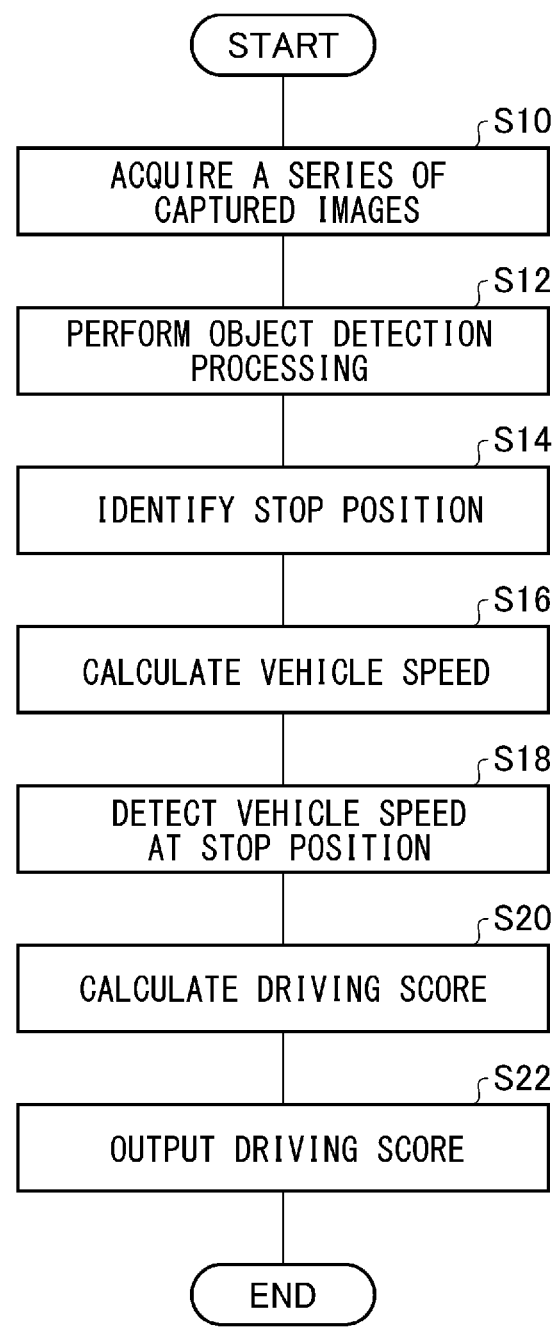
FIG. 6 is a flowchart of stop detection processing.

FIG. 6 is a flowchart of stop detection processing. The acquirer 30 acquires, from the image storage unit 12, a series of captured images captured by a vehicle-mounted camera (S10). The object detector 37 of the image processor 32 performs processing for detecting an object on the acquired series of captured images (S12). The object detector 37 then derives the type of a detected object and the position of the object on a captured image.

The stop position identification unit 38 detects a marking indicating a stop position among the objects detected by the object detector 37 and identifies the stop position (S14). The stop position identification unit 38 also calculates the distance between the stop position and the own vehicle.

The vehicle speed calculation unit 40 selects, as a feature point, an object that is not included in a specific region from among the objects detected by the object detector 37 and tracks the feature point in captured images in chronological order to calculate the vehicle speed based on the amount of positional displacement of the feature point (S16). The object that is not included in a specific region may be an object that does not overlap the specific region even partially or may be an object that does not overlap the specific region by half or more of the area. The vehicle speed calculation unit 40 may calculate the vehicle speed for each captured image or may calculate the vehicle speed only for a captured image in which a stop position is detected.

The detector 34 receives a distance between a stop position and the own vehicle from the stop position identification unit 38 and also receives vehicle speed from the vehicle speed calculation unit 40, so as to detect the vehicle speed at the stop position (S18). The detector 34 may detect whether the vehicle speed at the stop position is predetermined vehicle speed or lower.

The driving score calculation unit 36 calculates a driving score that indicates driving skill, based on the detection results from the detector 34 (S20). The output unit 14 provides the driving score thus calculated to an operator at a dealer or the driver (S22).

The present disclosure has been described with reference to an embodiment. The present disclosure is not limited to the embodiment described above, and various modifications including design modifications may be added based on the knowledge of those skilled in the art.

What is claimed is:

1. A stop detection device, comprising:
an acquirer that acquires a plurality of captured images captured in chronological order by a camera mounted on a vehicle;
an image processor that performs image processing on an acquired plurality of captured images; and
a detector that detects vehicle speed of the vehicle at a stop position based on a result of image processing,
the image processor comprising:
a stop position identification unit that identifies a stop position based on a marking indicating a stop position detected from a captured image; and
a vehicle speed calculation unit that calculates vehicle speed by comparing captured images in chronological order, wherein
the vehicle speed calculation unit excludes a specific region from each of a plurality of captured images to compare captured images;
wherein the vehicle speed calculation unit sets the specific region to a predetermined center region positioned in the center of a captured image.

2. The stop detection device according to claim 1, wherein the vehicle speed calculation unit sets the size of the specific region based on road information.

3. The stop detection device according to claim 1, wherein the vehicle speed calculation unit sets the specific region to a region that covers an individual moving object included in a captured image.

4. A stop detection device, comprising:
an acquirer that acquires a plurality of captured images captured in chronological order by a camera mounted on a vehicle;
an image processor that performs image processing on an acquired plurality of captured images; and
a detector that detects vehicle speed of the vehicle at a stop position based on a result of image processing,
the image processor comprising:
a stop position identification unit that identifies a stop position based on a marking indicating a stop position detected from a captured image; and
a vehicle speed calculation unit that calculates vehicle speed by comparing captured images in chronological order, wherein
the vehicle speed calculation unit excludes a specific region from each of a plurality of captured images to compare captured images;
wherein the vehicle speed calculation unit sets the specific region to one of a predetermined center region and a moving object, based on driving environment information.

5. The stop detection device according to claim 1, wherein the vehicle speed calculation unit tracks a feature point included in captured images arranged in chronological order to calculate vehicle speed.

6. A stop detection method implemented by a computer, the stop detection method comprising:
acquiring a plurality of captured images captured in chronological order by a camera mounted on a vehicle;
performing image processing on an acquired plurality of captured images; and
detecting vehicle speed of the vehicle at a stop position based on a result of image processing,
the performing image processing comprising:
identifying a stop position based on a sign indicating a stop position detected from a captured image; and
calculating vehicle speed by comparing captured images in chronological order, wherein
in the calculating vehicle speed, a specific region is excluded from each captured image to compare captured images, and the specific region is set to a predetermined center region positioned in the center of a captured image.

* * * * *